United States Patent [19]

Peifer et al.

[11] Patent Number: 4,589,639
[45] Date of Patent: May 20, 1986

[54] CENTERING DEVICE

[75] Inventors: Gary S. Peifer, Waynesville; Charles R. Russell, Edwards, both of Ill.

[73] Assignee: Caterpillar Tractor Co., Peoria, Ill.

[21] Appl. No.: 705,155

[22] Filed: Feb. 25, 1985

Related U.S. Application Data

[62] Division of Ser. No. 571,287, Jan. 16, 1984, abandoned.

[51] Int. Cl.$^4$ .................. B60K 23/00; F16F 1/12
[52] U.S. Cl. ...................... 267/150; 180/334
[58] Field of Search ............... 267/150; 180/78, 334; 82/45; 29/271, 272; 200/153 K; 280/775

[56] References Cited

U.S. PATENT DOCUMENTS

| | | | |
|---|---|---|---|
| 2,525,362 | 10/1950 | Levy | 267/150 |
| 2,756,610 | 7/1956 | Hibbard | 267/150 X |
| 3,737,003 | 6/1973 | Beals et al. | 180/78 |
| 3,959,614 | 5/1976 | Graninger | 200/153 K X |
| 4,209,074 | 6/1980 | York | 180/78 |
| 4,392,670 | 7/1983 | Schultz | 180/78 X |

Primary Examiner—Bruce H. Stoner, Jr.
Assistant Examiner—Richard R. Diefendorf
Attorney, Agent, or Firm—William C. Perry

[57] ABSTRACT

In the operator's station of a vehicle, it has been common practice to mount the steering wheel and the control levers needed to manipulate the vehicle on an adjustable control console. The control console may then be moved fore and aft to accommodate the individual operators that may operate the vehicle to enhance their comfort. Mechanical latching mechanisms have been used that provide only a selected number of positions to which the control console may be placed, and are often rather cumbersome. Hydraulic cylinders have also been incorporated into an adjustable control console design to provide an unlimited number of positions that the control console may assume. These designs, however, are quite complex, involving a plurality of hydraulic cylinders and extensive valving componentry. The present invention overcomes these problems by providing an actuating mechanism that is positioned about one of the pivot shafts that is utilized in the pivotal mounting of the control console to the vehicle frame. The actuating mechanism serves as a mounting member for a position locking device and allows the control console to be locked in a position anywhere between its maximum travel limits. A centering mechanism is also mounted about the same pivot shaft to maintain the actuating mechanism in a preselected position. With the actuating mechanism and the centering mechanism mounted about the pivot shaft the entire mechanism remains very effective and compact in structure.

12 Claims, 7 Drawing Figures

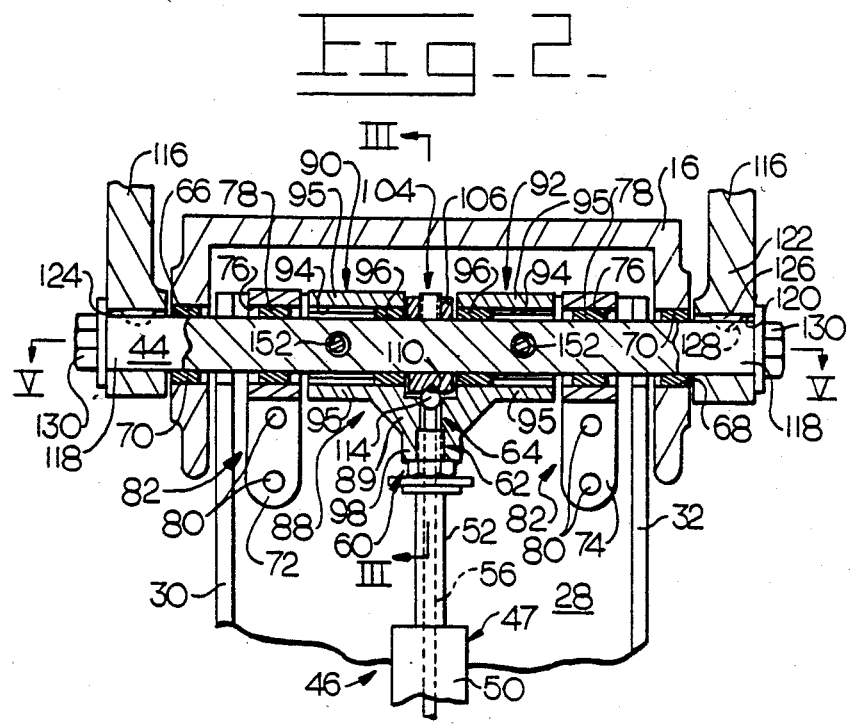
Fig_2_
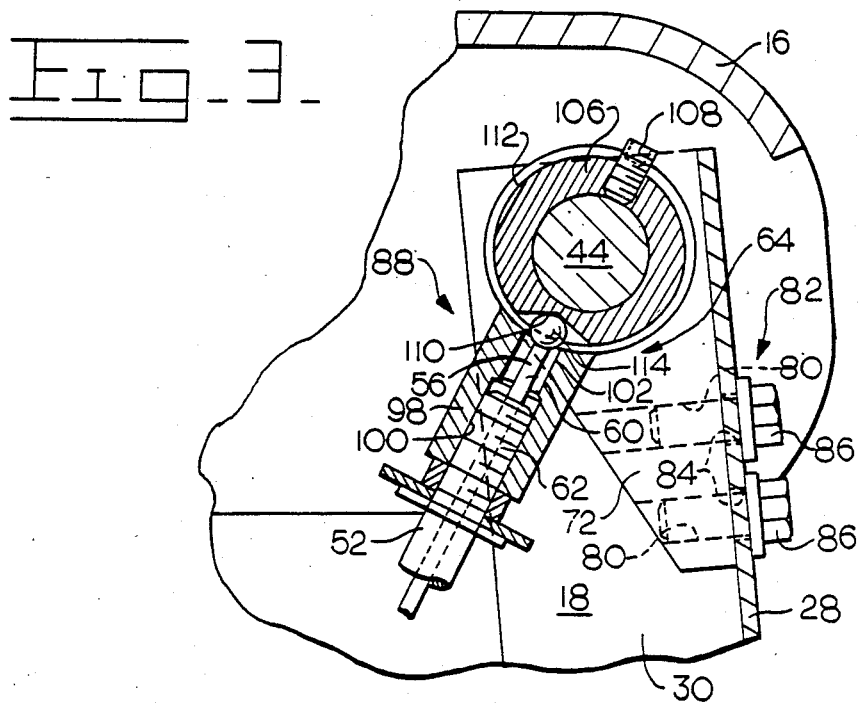
Fig_3_

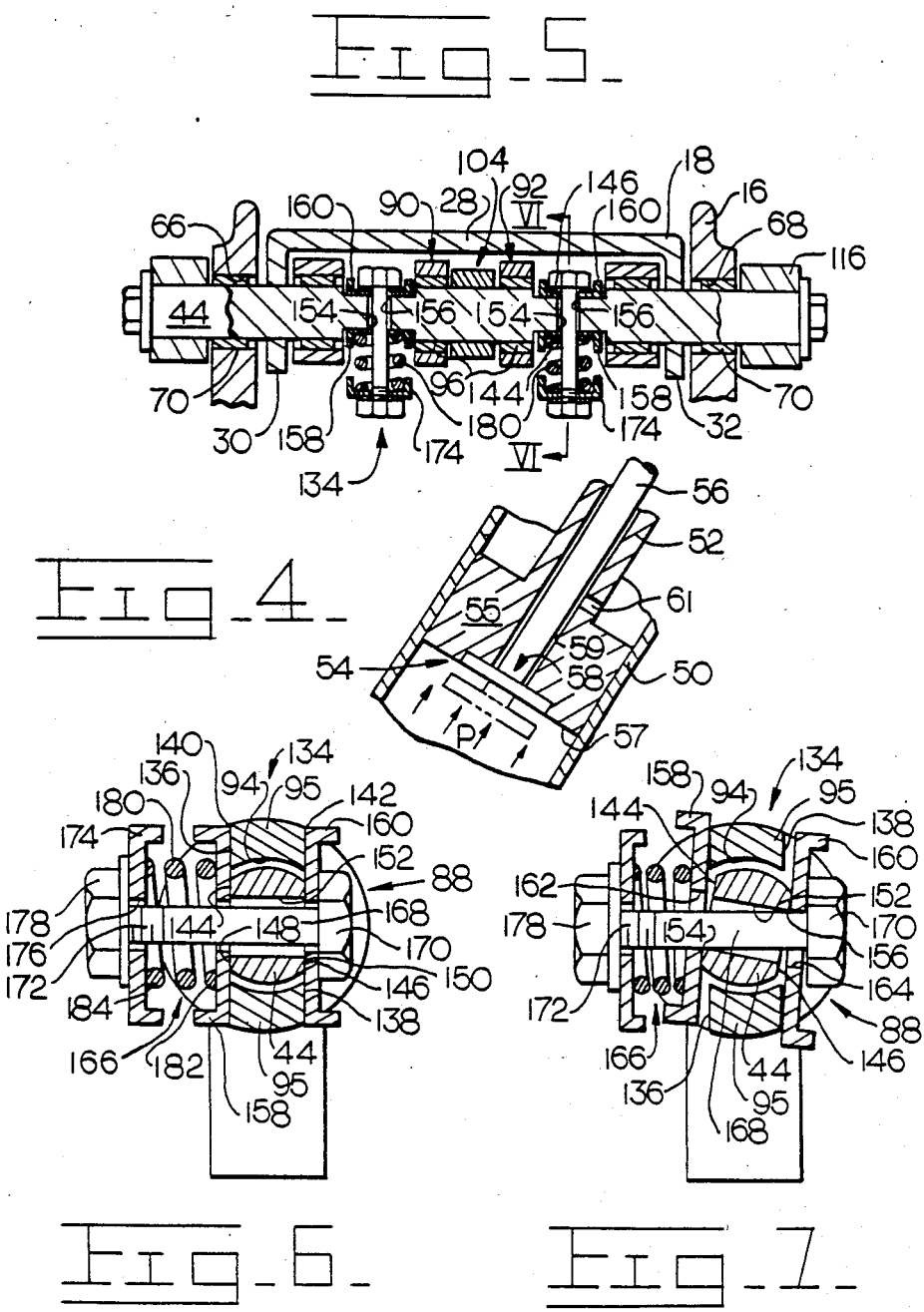

CENTERING DEVICE

This is a division of Ser. No. 571,287, filed Jan. 16, 1984, now abandoned.

DESCRIPTION

1. Technical Field

This invention relates to adjustable control consoles and more particularly to the mounting of an actuating means which is utilized to lock the console in an infinite number of operating positions.

2. Background Art

It has been common practice in vehicles to enhance operator comfort by providing adjustment of the vehicle controls with respect to the operator's seat. In some designs the entire control console, which includes the steering wheel and a plurality of control levers, pivots fore and aft at its connection with the vehicle. These designs are usually provided with a mechanical latching mechanism to allow the console a specific number of incremental adjustments. While this has been acceptable, it does present some drawbacks. One problem resides in the number of incremental positionings. The available space and the structural requirements dictate the number of allowable adjustments. Quite often they are not sufficient to accommodate every operator comfortably.

Another problem exists in the latching componentry itself. As previously mentioned, the latching mechanism must be of sufficient structural size to accommodate some fairly heavy loading. Since an operator is virtually always in contact with the steering wheel, he is often leaning on it with considerable weight. This can be compounded if he is operating a vehicle in rough terrain at which time he will hang onto the steering wheel as the vehicle bounces around. At other times an operator may use the steering wheel, as though it were a grab iron, as he enters the vehicle from the ground. In all of these instances, very high loading may be applied to the console, particularly around the latching mechanism. As a result, the size of the latching components are often very large and cumbersome. This can lead to added cost in a structure as well as cluttering the appearance of an unenclosed structure. A typical design is disclosed in U.S. Pat. No. 3,737,003, issued to Duane E. Beals et al on June 5, 1973, and is assigned to the assignee of this invention.

Other designs utilize a fluid actuated cylinder in place of a mechanical latching mechanism to provide an infinitely variable number of positions that the console may assume. U.S. Pat. No. 4,209,074, issued to Lyle E. York on June 24, 1980 and assigned to the assignee of the present invention, is one such design. It provides a console head which supports the steering wheel and the control levers, all of which are connected to the base by hydraulic cylinders. This allows the height as well as the fore and aft position of the steering wheel to be adjusted with respect to the base. It also allows the steering wheel to be positioned anywhere between the maximum extended and retracted limits of the hydraulic cylinders by controlling the flow of hydraulic fluid to one of the mounting cylinders which serves as a master cylinder. All other cylinders move in response to the master cylinder. Controlling an arrangement of this type requires fairly sophisticated hydraulic valving and plumbing all of which adds to the expense of the arrangement.

U.S. Pat. No. 4,392,670, issued to Donald L. Schultz on July 12, 1983, discloses a pivoting steering column that utilizes a pre-pressurized gas cylinder to continuously urge the column in one direction and a second cylinder that mechanically locks the position of the column. The actuating mechanism for the locking cylinder utilizes a plurality of cable actuated levers that serve to unlock the second cylinder. This design only provides two positions for the steering column. It employs a fairly extensive unlatching mechanism as well as needing one cylinder to urge the steering column to one position and a second cylinder to lock the steering column in another position.

The present invention is directed to overcoming one or more of the problems as set forth above.

DISCLOSURE OF THE INVENTION

In one aspect of the present invention an adjustable control member is provided that includes a base member and a support member that is mounted to the base member by a bracket means. The bracket means is connected to the base and support members by a plurality of pivot shafts in a manner that allows the support member to be moved relative to the base in a predetermined path of movement. A means for locking the position of the support member at any point along the path of movement and a means for actuating the locking means is provided with the actuating means being mounted on one of the pivot shafts.

In another aspect of the invention a centering mechanism is provided for use with an adjustable control member which comprises a mounting member having a pair of flat portions with one flat portion being formed on the first side of the mounting member and the other flat portion being formed on a second side of the mounting member, the mounting member having a bore extending axially through it. A shaft is also provided that has a pair of flat portions with one flat portion being formed on a first side of the shaft and the other flat portion being formed on the second side of the shaft with a bore extending transversely through the shaft between the flat portions. The shaft is positioned within the bore for relative rotation with respect to the mounting member in a manner wherein the flat portions of the shaft are in coplanar relation to the flat portions on the mounting member. A first plate having an aperture formed therein is positioned to engage the flat portion on the first side of the mounting member and the flat portion on the first side of the shaft. A second plate having an aperture formed therein is positioned to engage the flat portion on the second side of the mounting member and the flat portion on the second side of the shaft. A biasing means is positioned to bias the first and second plates toward engagement with each of the mounting member and the shaft.

Utilizing the improvements described above, an adjustable control console is provided that has the actuating mechanism postioned about one of the pivot shafts that is normally used in the mounting of the console. In doing so, the cumbersome latching mechanism of past designs may be totally eliminated, as will the expense. Also by using a pre-pressurized gas spring as a position locking device, the console may be infinitely adjustable. Further, since the centering mechanism is also positioned about the same pivot shaft as the actuating mechanism, the visual appearance of an unenclosed structure is very neatly maintained.

BRIEF DESCRIPTION OF THE DRAWINGS

FIG. 2 is a diagrammatic, fragmentary sectional view taken along lines II—II of FIG. 1;

FIG. 3 is a diagrammatic, enlarged sectional view taken along lines III—III of FIG. 2;

FIG. 4 is a diagrammatic enlarged sectional view of the area as indicated at IV in FIG. 1.

FIG. 5 is a diagrammatic, enlarged sectional view taken along lines V—V of FIG. 2; and FIG. 6 and FIG. 7 are diagrammatic, enlarged sectional views illustrating the area along lines VI—VI of FIG. 5 in two modes of operation.

BEST MODE FOR CARRYING OUT THE INVENTION

Figure 1:
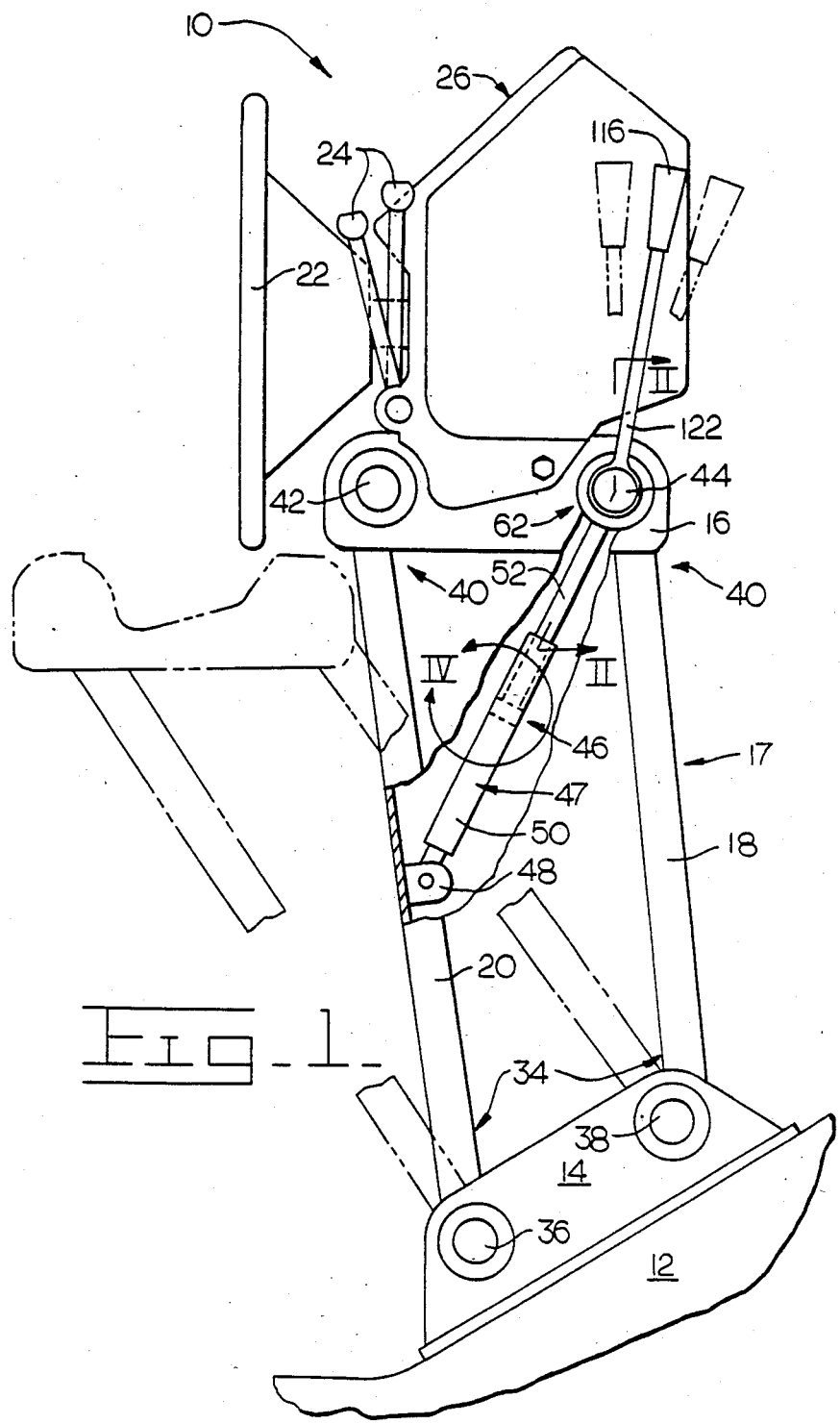
FIG. 1 is a diagrammatic side elevational view of a control console having a portion broken away to illustrate an embodiment of the present invention.

Referring to the drawings, a control console 10 for a vehicle is shown extending upwards from a vehicle frame 12 being mounted to the frame by a base member or bracket 14. The console includes a support member 16 which is mounted to the base by a bracket means 17 that consists of a pair of U-shaped channels 18 and 20 that are disposed forwardly and rearwardly with respect to the frame. The support member in turn serves as a mounting structure for a steering wheel 22 and a plurality of control levers 24 as well as the vehicle's instrument panel 26, all of which control the operation of the vehicle.

As best shown in FIGS. 2 and 3, each of the channels 18 and 20 has a basewall portion 28 and a pair of outwardly extending sidewall portions 30 and 32. A lower extremity 34 of each of the channels is mounted to the base 14 by a pair of pivot shafts 36 and 38. Each pivot shaft extends through the base 14 and through the sidewall portions 30 and 32 of each channel to allow relative pivotal movement between the channels and the base 14. An upper extremity 40 of the channels is mounted in similar fashion to the support member 16 by a pair of pivot shafts 42 and 44. The pivot shafts 36, 38, 42 and 44 are arranged to substantially form a parallelogram. Thus, the steering wheel 22 and control levers 24 may be moved in a path that lies in a fore and aft direction with respect to the vehicle frame 12.

A positioning locking device 46 is provided in the form of a gas spring 47 that is filled with a pre-pressurized fluid P. The gas spring is connected to channel 20 at a generally central location 48 and extends upwardly and forwardly to engage the pivot shaft 44. The gas spring has a cylinder portion 50 and a rod portion 52 that is extensible therefrom in response to a preselected pressure in the cylinder portion. The gas spring 46 also includes a valve means 54 that is positioned in a piston member 55 and opens onto a first side 57 thereof. The valve means is positioned over a pair of passageways 59 and 61 that seleictively communicate fluid from one side of piston 55 to the other. An actuator rod or plunger 56 is positioned coaxially within the rod portion 52 and has a first end portion 58 that extends through piston 55 and is engaged with the valve means 54. A second end 60 of the plunger 56 terminates just past a distal end 62 of the rod portion. The plunger 56 is reciprocally movable with respect to the rod portion and serves as an actuating means 64 for valve 54 to place the gas spring in a first condition wherein the rod portion 52 is permitted to selectively extend and retract, and a second condition wherein the rod portion 52 is locked in any selected extended position. The structure of the gas spring 47 is conventional and they are commercially available, for example, from Stabilus G.M.B.H. under its trademark "Bloc-O-Lift".

Pivot shaft 44, which is shown best in FIGS. 2 and 5, extends through a pair of bores 66 and 68 in support member 16. A pair of sleeve bearings 70 are positioned in each bore 66 and 68 between the pivot shaft 44 and the support member 16 to accommodate relative rotation therebetween. Inwardly of the support member 16, the pivot shaft also passes through a pair of bearing support brackets 72 and 74. Each bearing support bracket also has a bore 76 extending axially through it. Each bore 76 also mounts a sleeve bearing 78 to accommodate relative rotation of the pivot shaft 44 with respect to the bearing support brackets 72 and 74. The brackets also have a plurality of threaded mounting holes 80 which are positioned on a lower portion 82 of the brackets 72 and 74. The mounting holes 80 align with a complimentary number of holes 84 in channel 18. A suitable fastener 86, such as a bolt, is positioned through each of the aligned pairs of holes and secures the brackets 72 and 74 to channel 18 thus effectively supporting pivot shaft 44.

Centrally disposed about the pivot shaft 44 is a bifurcated mounting member 88 which is best shown in FIGS. 2 and 3. The mounting member 88 has a yoke portion 89 which consists of a pair of spaced apart mounting sleeves 90 and 92. Each sleeve has a bore 94 extending axially therethrough and a pair of axially extending lugs 95. The bore 94 is of sufficient diameter to receive the pivot shaft 44 within each sleeve with the lugs 95 being positioned to partially encompass the pivot shaft at diametrically opposed locations (FIGS. 6 and 7). A pair of bearings 96 are disposed between the bores 94 and the pivot shaft 44 to allow relative rotation of the pivot shaft with respect to the mounting member 88. Turning to FIG. 3, the mounting member also includes a connecting portion 98 that extends from each of the mounting sleeves 90 and 92 at a central location between them. The connecting portion 98 has a threaded aperture 100 formed therein that extends internally along the length of the connecting portion 98 and terminates at an enlarged actuating chamber 102. The chamber lies adjacent the juncture between the connecting portion 98 and the mounting sleeves 90 and 92 and opens onto a space 104 formed between the mounting sleeves. The distal end 62 of rod portion 52 of the gas spring 46 is threadably received within the threaded aperture 100 and is positioned relative to the connecting portion 98 such that the second end 60 of the plunger is located within the actuating chamber 102.

An enlarged cylindrical member 106 is also positioned about the pivot shaft 44. The cylindrical member is secured to the pivot shaft, for rotation with the shaft, by any suitable means such as a set screw 108. The cylindrical member is generally centrally located along the pivot shaft and is positioned within the space 104 between the mounting sleeves 90 and 92. In the illustrated embodiment the cylindrical member serves as a detent mechanism having an indentation 110 formed on its outer periphery 112. The indentation is oriented on the periphery 112 such that it faces the actuating chamber 102. A spherical member or ball 114 is placed in the actuating chamber and is in contact with the second end 60 of the plunger 56 on one surface and is nested within the indentation 110 on the cylindrical member 106 on an opposing surface. While the cylindrical member has been illustrated as a detent mechanism, it should be pointed out that the cylindrical member could include a camming device to act against the spherical member in a like manner.

An actuating lever 116 is mounted on each end 118 of the pivot shaft 44 (FIG. 2). Each mounting lever has a mounting bore 120 extending through one end 122. An axially extending keyway 124 is formed in the lever with the keyway opening onto the mounting bore 120 and extending along the length of the bore. The lever 116 is mounted such that the end 118 of the pivot shaft 44 is positioned within the bore 120. A key 126 is nested within a curvilinear slot 128 that is formed in the outer surface of the pivot shaft. The key 126 engages the keyway 124 in the lever to nonrotatably secure the lever to the pivot shaft. The lever 116 is held from axial movement with respect to the pivot shaft by a fastener such as a bolt 130.

Turning now to FIGS. 5, 6 and 7, a pair of centering mechanisms 134 are disclosed which are engaged between each mounting sleeve 90 and 92 and the pivot shaft 44 at spaced locations. Since each of the centering mechanisms 134 is identical in structure, only one will be described hereinafter with reference numerals being applicable to both devices. Each of the mounting sleeves 90 and 92 has a pair of generally vertically extending flat portions 136 and 138, one of which is formed on a first side 140 of the lug portion 95 of mounting member 88 and the other of which is formed on a second side 142 of the lug 95. A second pair of vertically extending flat portions 144 and 146 are formed on the pivot shaft 44, one being located on a corresponding first side 148 of the pivot shaft and the other of which is positioned on a corresponding second side 150 of the pivot shaft. A bore 152 extends transversely through the pivot shaft with opposing ends 154 and 156 (FIG. 5) thereof opening onto each of the opposed flat portions 144 and 146. The flat portions 136 and 138 of the mounting member 88 are positioned in coplanar relation to the flat portions 144 and 146 of the pivot shaft 44 respectively. A first, U-shaped spacer plate 158 is engaged with the flat portion 136 on the first side 140 of lug 95 and also the flat portion 144 on the first side 148 of the pivot shaft 44. A second, U-shaped spacer plate 160 is engaged with the flat portion 138 on the second side 142 of lug 95 and also the flat portion 146 on the second side 150 of the pivot shaft 44. Both the first and second plates 158,160 have an aperture 162 and 164 (FIG. 7), respectively, centrally disposed therethrough. The apertures 162,164 in the plate are placed in registry with the transverse bore 152 that extends transversely through the pivot shaft 44. A biasing means 166 is positioned within the aligned apertures 162,164 in the first and second plates 158,160 and the bore 152 in the pivot shaft.

The biasing means 166 includes an elongated member 168 such as a bolt which has an enlarged first end portion 170 such as a bolt head, and a threaded second end portion 172. The bolt head 170 is arranged to engage the second plate 160. A U-shaped retainer 174 having a centrally disposed mounting bore 176 extending through it is positioned about the bolt 168 in opposing relation to the first plate 158. A fastener, such as a nut 178, is threadably engaged with the threaded end portion 172 of the bolt to butt up against the retainer 174 to limit its outward travel with respect to the bolt. A coil spring 180 is captured between the first plate 158 and the retainer 174 having a first end 182, engaged with the first plate 158, and a second end 184 engaged with retainer 174 to urge them resiliently apart. In doing so, the force of the spring acts against the retainer 174 and the nut 178 and thus urges the bolt leftwardly as viewed in FIGS. 6 and 7. This in turn urges the bolt head 170 and the second plate 160 into engagement with the respective flat portions 138,146 on the second side 142 and 150 of lug 95 and the pivot shaft 44 respectively. Likewise, since the spring 180 abuts the first plate 158, it in turn is urged against the respective flat portions 136,144 on the first sides 140 and 148 of lug 95 and the pivot shaft 44 respectively. As a result, the first and second plates tend to maintain the relative rotational positioning between the shaft 44 and the mounting member 88 by their respective engagement with the coplanar flat portions 136,144,138,146 on the two components, in absence of any movement of the actuating lever 116 in either direction.

Industrial Applicability

In operation, the actuating lever 116 may be moved in either direction, to release the position locking device 46 which in turn, allows the entire control console 10 to be moved in a fore and aft direction with respect to the vehicle frame 12.

As is best shown in FIGS. 3 and 7, rotation of lever 116 causes rotation of the pivot shaft 44. The cylindrical member 106 which rotates with the pivot shaft 44, will displace the ball 114 from its engagement with the indentation 110 as the rotation occurs. As the ball is displaced from the indentation, it is moved inwardly with respect to the actuating chamber 102 in the mounting member 88 into engagement with the second end 60 of the plunger 56. When the plunger is moved inwardly towards the piston 55, this actuates the valve means 54 into its open condition, as shown in phantom lines in FIG. 4. With the gas spring in this condition, the transfer of fluid from one side of piston 55 to the other occurs through passageways 59 and 61 as the operator moves the console 10 fore or aft to selectively position the support member 16, steering wheel 22 and implement levers 24, with respect to the frame 12. Since the side 57 of the piston 55 has a larger cross-sectional area than that of the opposite side to which the piston rod 52 is connected, the pressure P in the cylinder automatically tends to bias the piston in an upwardly direction as viewed in FIG. 4. This biasing force is easily countered by an operator as he moves the console 10 rearwardly.

While the pivot shaft 44 is rotated to the previously described position, it is positioned relative to the mounting member 88 in a manner shown in FIG. 7. As shown, the transverse bore 152 in the pivot shaft 44 is somewhat larger than the diameter of the bolt 168. When the actuating lever 116 is rotated to place the position locking device 46 and the support member 16 in their first condition, the actuating lever may be moved until the ends 154,156 of the bore 152 contact the bolt 168. This provides a mechanical stop for the actuating lever when moved in either direction. Also, when the pivot shaft 44 is so positioned, the flat portions 144,146 of the pivot shaft are moved out of surface engagement with the first and second plates 158,160. At this point only an edge of each flat portion will be in contact with the respective plates 158,160, thus moving the plates against the resiliency of the spring 180. Upon release of the actuating lever 116, the resiliency of the spring will tend to bias the plates back to their original position of surface engagement with the respective flat portions 136,144,138,146. This causes the actuating lever 116 to always be returned to its original position shown in solid lines in FIG. 1.

Upon return of the actuating lever 116 to its original position, the pivot shaft 44 as previously described also returns to the position illustrated in FIG. 6. Likewise, the ball 114 is again nested within the indentation 110 of the cylindrical member 106. As a result, the plunger 56 is then moved upwardly and the valve means 54 is once against closed. Once the valve is closed, the transfer of pressurized fluid from one side of piston 55 to the other is blocked, thus the rod portion 52 of the gas spring 46 is locked from movement with respect to the cylinder portion 50. When in its locked condition, the gas spring prevents movement of the support member 16 with respect to the vehicle frame 12.

Thus it may be seen from the foregoing description that the actuating means 64 and the centering mechanism 134 provided for use with the adjustable control console 10, utilize relatively few components that are contained in a very compact design. This is made possible because the actuating means 64 and the centering mechanism 134 are both supported about the pivot shaft 44. The pivot shaft is a necessary structural component that is normally used in an adjustable console design that is pivotally supported by a parallelogram-type linkage. By incorporating a pre-pressurized gas spring 47 into the design, infinite adjustability of the console 10 is achieved while the actuating means and the centering mechanism of the present invention remain very compact in size and very efficient in design. A design of this type obviates the need for the very costly mechanical latch mechanisms that require a great deal more space within the console structure and only provide a selected number of positions for the control console between its maximum travel limits. It also eliminates the very costly hydraulic componentry that has been associated with previous designs that allow infinite adjustability, while remaining extremely simple in design.

Other aspects, objects and advantages of this invention can be obtained from a study of the drawings, the disclosure and the appended claims.

We claim:

1. A centering mechanism comprising:
   an elongated member;
   a shaft member having opposing flat portions formed thereon and a bore extending therethrough, said elongated member being positioned within the bore of the shaft member to loosely support the shaft member thereon for limited rotation about an axis that is normal to the axis of the elongated member;
   a first and second plate each being loosely disposed on the elongated member in embracing relation to the flat portions on the shaft member; and
   means for biasing said plates towards embracing engagement with the flat portions and permitting movement of the plates away from each other during rotation of the shaft member.

2. A centering mechanism as set forth in claim 1 further including a mounting member having a pair of opposed flat portions and defining a bore therethrough sufficient for receiving the shaft member therein, said shaft member being positioned for relative rotation with respect to the mounting member with the flat portions of said shaft member being positioned in coplanar relation to the flat portions of the mounting member.

3. A centering mechanism as set forth in claim 1, wherein an actuating lever is attached to the shaft member to affect the rotation of the shaft member in either direction and the biasing means maintains the actuating lever at a preselected position in absence of rotation of the actuating lever.

4. A centering device as set forth in claim 1 wherein said elongated member has an enlarged first end portion and a threaded second end portion.

5. A centering device as set forth in claim 4, wherein said biasing means includes a coil spring that is positioned about the elongated member and is captured between the first plate and a retainer that is threadably engaged with the second end portion of the elongated member, said spring urging said first plate into engagement with one of the coplanar flat portions on each of the mounting member and the shaft member.

6. A centering mechanism as set forth in claim 5 wherein the enlarged first end portion of the elongated member engages the second plate and urges said plate into engagement with the opposing coplanar flat portions on each of the mounting member and the shaft member under the bias of the spring.

7. A centering mechanism for use with an adjustable control member, comprising:
   a mounting member having a pair of flat portions, one flat portion being formed on a first side of the mounting member and the other flat portion being formed on a second side of the mounting member, said mounting member having a bore extending axially therethrough;
   a shaft having a pair of flat portions, one flat portion being formed on a first side of the shaft and the other flat portion being formed on a second side of the shaft, and a bore extending transversely through the shaft between the flat portions, said shaft being positioned within said bore of the mounting member for relative rotation with respect to the mounting member, said flat portions of the shaft being in coplanar relation to the flat portions on the mounting member;
   a first plate having an aperture formed therein and being positioned to engage the flat portion on the first side of the mounting member and the flat portion on the first side of the shaft;
   a second plate having an aperture formed therein and being positioned to engage the flat portion on the second side of the mounting member and the flat portion on the second side of the shaft; and means for biasing the first and second plates towards engagement with each of the mounting member and the shaft.

8. A centering mechanism as set forth in claim 7 wherein said biasing means is positioned to extend through the apertures in the first and second plates and through the transverse bore in the shaft.

9. A centering mechanism as set forth in claim 8 wherein said biasing means further includes:
   an elongated member having an enlarged first end portion and a second end portion having threads formed thereon, said enlarged end portion being engaged with the second plate;
   a retainer having a centrally disposed opening and being positioned about the second end portion of the elongated member;
   a fastener threadably engaged with the second end portion of the elongated member at a location adjacent the retainer;

a spring having a first end engaging the first plate and a second end engaging the retainer, said spring urging the first and second plates into engagement with their respective flat portions.

10. A centering mechanism as set forth in claim 9 wherein the transverse bore in the shaft has a diameter that is larger than that of the elongated member to allow a preselected amount of a relative rotation between the shaft and the mounting member.

11. A centering mechanism as set forth in claim 9 wherein the elongated member is a bolt and the fastener is a nut.

12. A centering mechanism as set forth in claim 7 wherein an actuating lever is connected to the shaft to provide relative rotation thereof in either direction with respect to the mounting member, said actuating lever being positioned in a preselected location by the biasing means.

* * * * *